(12) United States Patent
Calmon et al.

(10) Patent No.: US 12,607,169 B2
(45) Date of Patent: Apr. 21, 2026

(54) METHOD FOR REPAIRING A SHEAR WEB OF A WIND TURBINE ROTOR BLADE AND WIND TURBINE ROTOR BLADE

(71) Applicants: Nordex Energy SE & Co. KG, Hamburg (DE); Nordex Energy Spain S.A.U., Barásoain (ES)

(72) Inventors: Pierre Calmon, Barásoain (ES); Alvaro Pipo Benito, Barásoain (ES); Iker Villar Ochoa, Barásoain (ES); Iosu Garcia Aguerri, Barásoain (ES); Felix Hahn, Hamburg (DE)

(73) Assignees: Nordex Energy SE & Co. KG, Hamburg (DE); Nordex Energy Spain S.A.U., Barásoain (ES)

( * ) Notice: Subject to any disclaimer, the term of this patent is extended or adjusted under 35 U.S.C. 154(b) by 0 days.

(21) Appl. No.: 19/034,329

(22) Filed: Jan. 22, 2025

(65) Prior Publication Data

US 2025/0237196 A1 Jul. 24, 2025

(30) Foreign Application Priority Data

Jan. 24, 2024 (EP) .................................... 24382062

(51) Int. Cl.
*F03D 80/50* (2016.01)
*F03D 1/06* (2006.01)
(52) U.S. Cl.
CPC ......... *F03D 80/502* (2023.08); *F03D 1/0681* (2023.08); *F05B 2230/80* (2013.01); *F05B 2280/6003* (2013.01)
(58) Field of Classification Search
CPC .... F03D 1/0681; F03D 1/0682; F03D 1/0684; F03D 80/502; F05B 2230/80; B64C 3/185; B64C 27/473; B64C 2027/4736
See application file for complete search history.

(56) References Cited

U.S. PATENT DOCUMENTS 7,306,692 B2 * 12/2007 Graham .................. B29C 73/32
156/304.3
7,927,077 B2 * 4/2011 Olson ..................... B29C 73/10
416/229 R (Continued)

FOREIGN PATENT DOCUMENTS

KR 10-2014-0001407 A 1/2014

OTHER PUBLICATIONS

Cripps, D., "Wind Turbine Blade Repair", Wind Systems Magazine, Apr. 8, 2011, p. 1 to 5.

(Continued)

*Primary Examiner* — Nathaniel E Wiehe
*Assistant Examiner* — Jason G Davis
(74) *Attorney, Agent, or Firm* — Walter Ottesen, P.A.

(57) ABSTRACT

A method is for repairing a shear web of a wind turbine rotor blade, wherein the shear web includes a defect at the root end, the defect running essentially along a longitudinal direction of the wind turbine rotor blade. The method includes the steps of: providing a defect-bridging device having a first cover plate and a second cover plate, both the first cover plate and the second cover plate including an inner surface and an outer surface, and bonding the first cover plate with its inner surface onto a first surface region of the shear web and bonding the second cover plate with its inner surface onto a second surface region of the shear web, such that both cover plates at least partly cover the defect. A repair assembly is for repairing a shear web of a wind turbine rotor blade.

18 Claims, 7 Drawing Sheets

(56)                    References Cited

U.S. PATENT DOCUMENTS

|  |  |  |  |
|---|---|---|---|
| 8,747,592 B2 | 6/2014 | Stenbaek et al. | |
| 11,247,301 B2 * | 2/2022 | Girolamo | B23P 6/007 |
| 11,305,462 B2 * | 4/2022 | Schibsbye | B29C 70/548 |
| 11,312,507 B2 * | 4/2022 | Cheng | B64C 1/12 |
| 11,466,661 B2 * | 10/2022 | Warzok | F03D 1/0675 |

OTHER PUBLICATIONS

CompositePatch by aplTeclTec^ R, "Wind Energy Repairs", Dec. 31, 2012, Spain, pp. 1 to 6 (8 pages).
Extended European search report of the European Patent Office dated Jul. 29, 2024 in European application No. 24382062.8 on which the claim of priority is based.

\* cited by examiner

<u>Fig. 2</u>
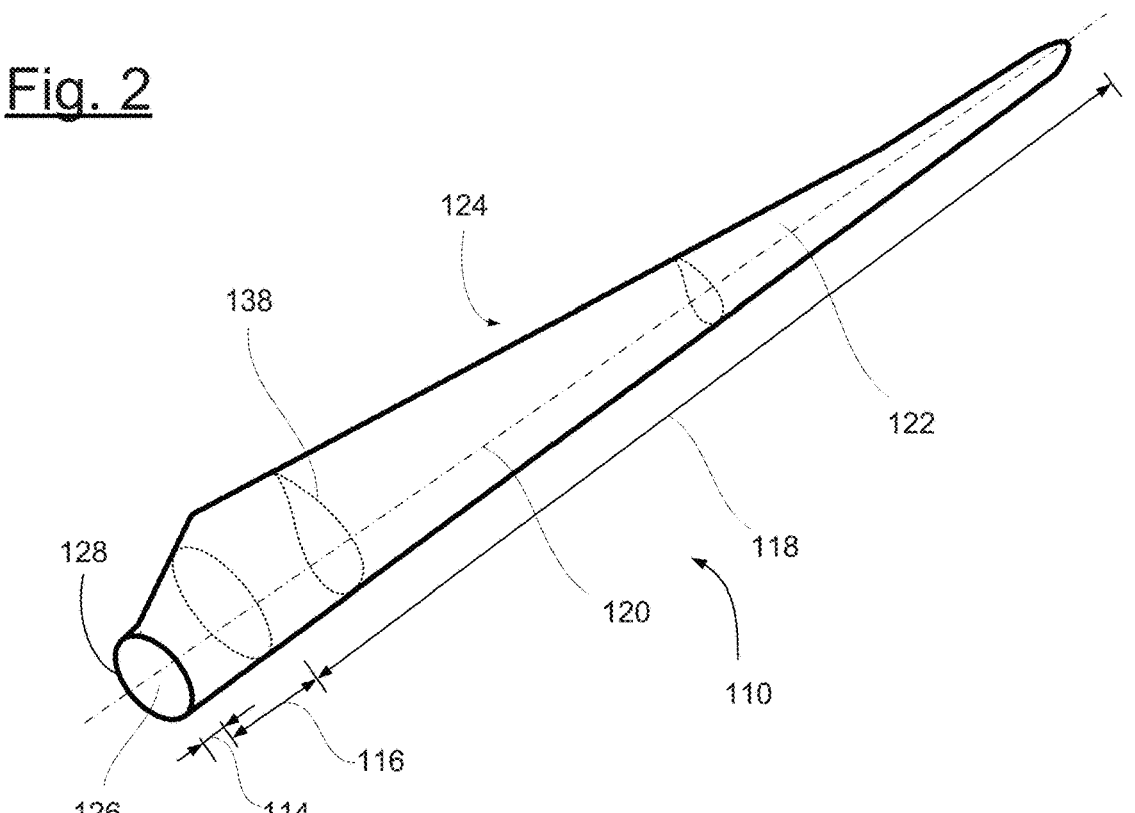
<u>Fig. 3</u>
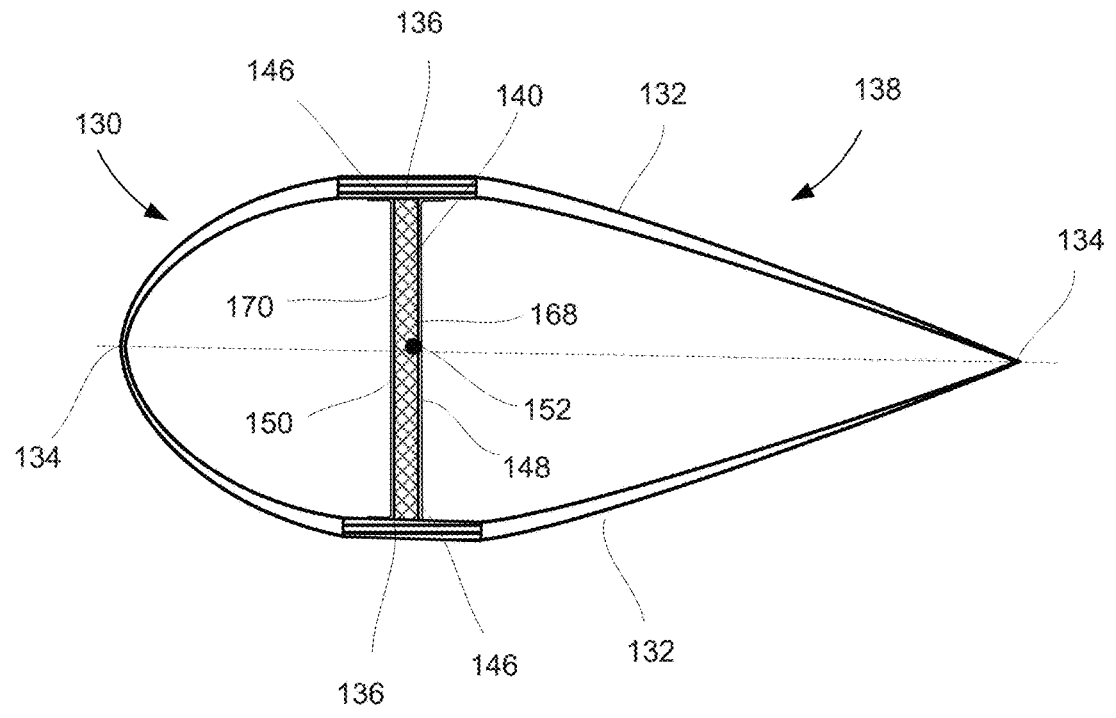

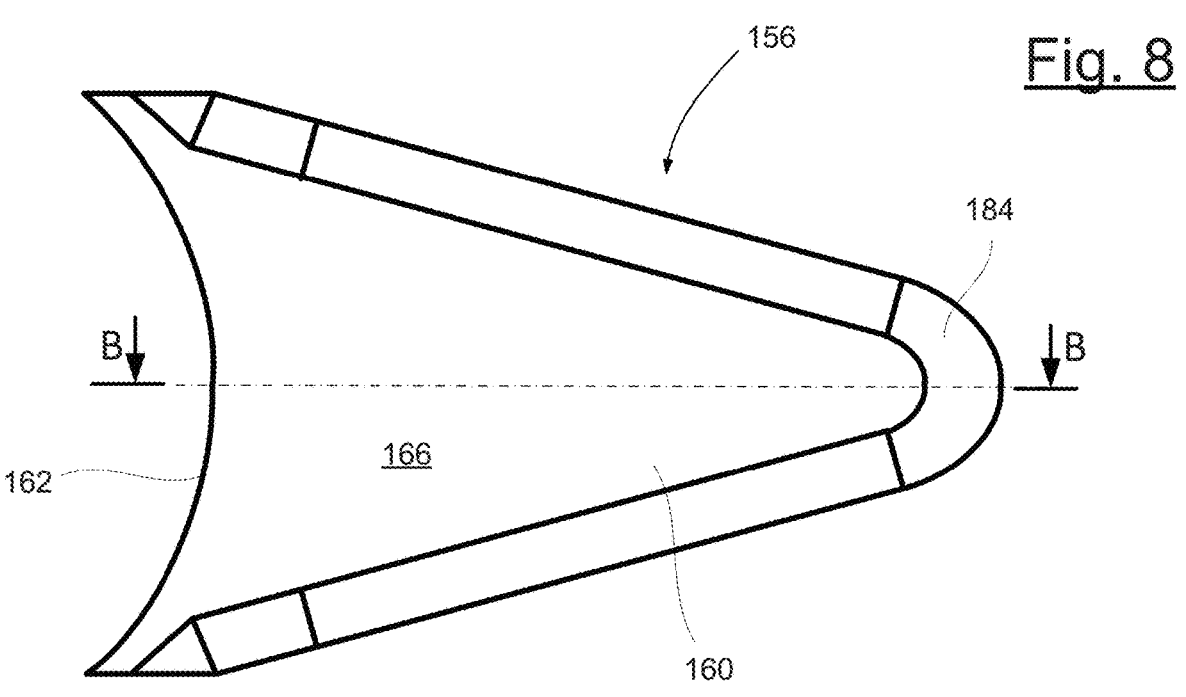
Fig. 8
Fig. 9
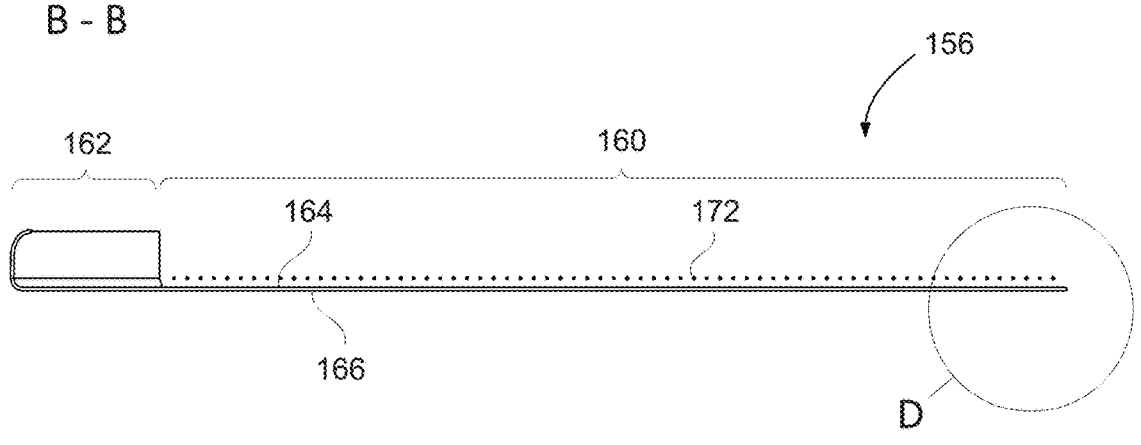
B - B
Fig. 10
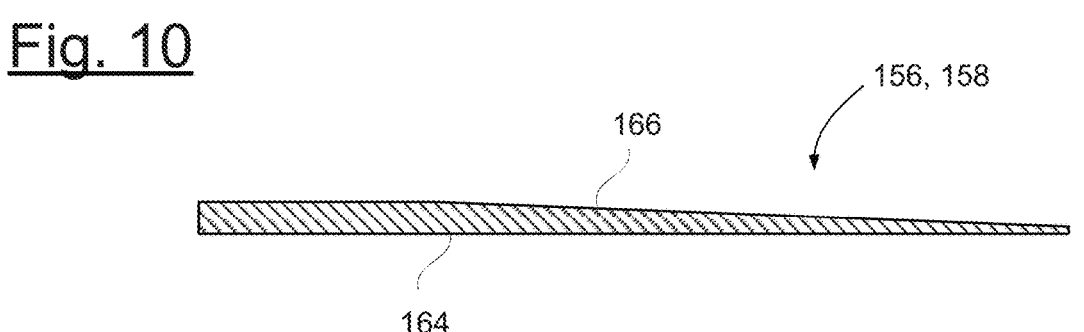

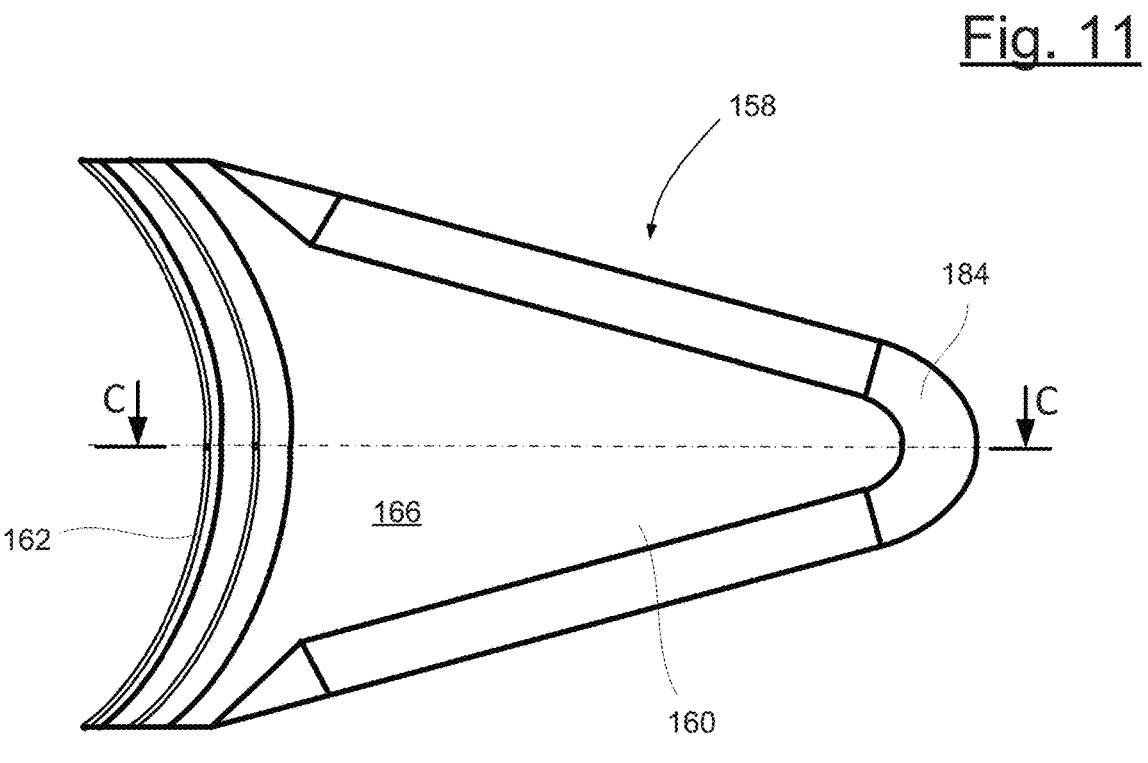
Fig. 11
Fig. 12
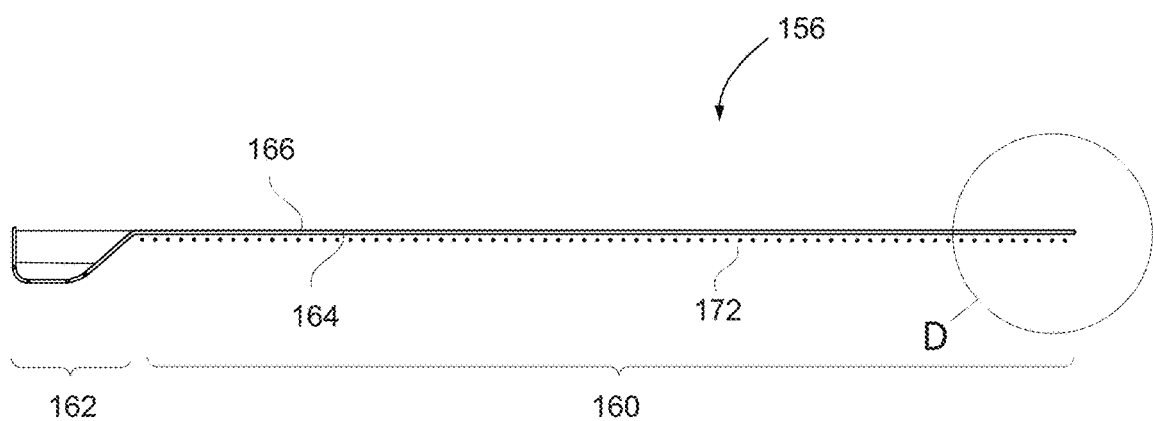

METHOD FOR REPAIRING A SHEAR WEB OF A WIND TURBINE ROTOR BLADE AND WIND TURBINE ROTOR BLADE

CROSS-REFERENCE TO RELATED APPLICATIONS

This application claims priority of European patent application no. 24382062.8, filed Jan. 24, 2024, the entire content of which is incorporated herein by reference.

TECHNICAL FIELD

The disclosure concerns a method for repairing a shear web of a wind turbine rotor blade, wherein the wind turbine rotor blade includes two spar caps and the shear web. The disclosure also addresses a wind turbine rotor blade.

BACKGROUND

Wind turbines with wind turbine rotor blades are widely known from the state of the art and are used to convert wind energy into electrical energy. Wind turbine rotor blades are typically manufactured according to one of two constructional configurations, namely a configuration where a thin aerodynamic shell is glued or otherwise bonded onto a spar beam, or a configuration where spar caps, also called main laminates, are integrated into the aerodynamic shell. With regard to the latter configuration, the spar caps are integrated into the shell and are molded together with the aerodynamic shell. In this configuration, the spar caps constitute the load carrying structure. The blade shells are typically configured with at least one spar cap integrated in the pressure side shell part and at least one spar cap integrated in the suction side shell part. The spar caps of the pressure and suction side are typically connected via one or more shear webs, which for instance may be C-shaped or I-shaped. Such a shear web reinforces the blade structure and absorbs shear forces.

As with other components of a wind turbine rotor blade, shear webs can wear out and suffer damage, wherein, for example, a crack can be formed which mechanically weakens the structure of the shear web. This can have severe consequences for the wind turbine rotor blade, up to and including complete breakdown.

SUMMARY

It is an object of the disclosure to provide a concept to reliably and efficiently repair a shear web of a wind turbine rotor blade.

According to a first aspect, a method for repairing a shear web of a wind turbine rotor blade is disclosed. The wind turbine rotor blade includes two spar caps and a shear web. The shear web includes a root end and a tip end and extends between the two spar caps along a longitudinal direction of the rotor blade from the root end to the tip end. The shear web has two opposite longitudinal edges, each longitudinal edge facing a respective spar cap and running along the longitudinal direction. The shear web has a first lateral side and a second lateral side running between the two opposite longitudinal edges. The shear web has a defect at the root end, the defect running essentially along the longitudinal direction. The method includes the steps of:

provide a defect-bridging device having a first cover plate and a second cover plate, both the first cover plate and the second cover plate including an inner surface and an outer surface, and bonding the first cover plate with its inner surface onto a first surface region of the first lateral side and bonding the second cover plate with its inner surface onto a second surface region of the second lateral side, such that both cover plates at least partly cover the defect.

With a standard repair approach, laminate layers and core material of the shear web would conventionally be removed and replaced with new repair material. Such a conventional approach would include a lot of manual work, for example, layup of repair laminate layers by hand, and typically takes about two to three working shifts.

With the inventive method as described herein, a quick, easy and secure repair of a defect of a shear web is enabled. The method features the use of a prefabricated defect-bridging device, which includes prefabricated cover plates. The cover plates are simply bonded in place to at least partly cover the defect. With these plates, the defect is structurally bridged and the shear web is fully functional again.

The method has the following further advantages.

The time needed for repairing can be drastically reduced, in particular to one shift (instead of two to three shifts as explained above).

The repair process is a very simple process. For example, less experienced technicians can repair a defect with sufficiently good quality.

Very good laminate quality can be ensured with the prefabricated parts.

A short-term application is possible to cover a defect of the shear web with the pre-fabricated parts.

Costs for repair are reduced, in particular due to the decrease in working hours.

The defect means a structural defect, for example, a delamination, a crack or combinations thereof. A defect which is not repaired could lead to a complete failure, for example, break, of the shear web.

The term "essentially" means that the defect extends mainly along the longitudinal direction. However, the defect, for example, the crack, does not necessarily run linearly or parallel to the longitudinal direction.

The first and second cover plates are prefabricated parts, as mentioned before.

The term "at least partly cover the defect" means that nearly all portions of the defect are covered by the cover plates. Preferably, the cover plates cover the defect completely and extend beyond the defect on all sides of the defect over a specified area.

According to an embodiment, the surface regions are pre-treated prior to the bonding step. For example, the surface regions are cleaned, grinded and/or roughened. Thus, a particularly good bonding of the plates with the shear web is achieved.

According to an embodiment, the inner surface of the first cover plate and the inner surface of the second cover plate is covered by a peel ply. A peel ply protects the respective surface.

According to an embodiment, the peel ply covering the inner surfaces of the first and second cover plates is removed prior to the bonding step. This makes it possible to protect the inner surfaces of the cover plates until shortly before the bonding step and discards the need of preparing this surface by grinding.

According to an embodiment, prior to the bonding step, adhesive is applied to the inner surface of the first cover plate and the inner surface of the second cover plate to bond them to the respective surface region. For example, the inner surfaces are provided with adhesive shortly after the peel plies are removed. This ensures a high-quality bonding process.

According to an embodiment, prior to the step of bonding, adhesive is applied to each of the surface regions. This ensures a high-quality bonding process wherein, alternatively to the above, the shear web, not the cover plates, is provided with adhesive. However, to improve the bonding process even more, both the surface regions of the shear web as well as the inner surfaces of the cover plates are provided with adhesive. In an embodiment, a two-component adhesive is used, which is applied to the surface regions and/or to the inner surfaces. This can result in a particularly strong or reliable bonding.

According to an embodiment, prior to the bonding step, a mesh is applied to each of the two surface regions, each mesh acting as a spacer. The mesh guarantees a necessary or predetermined bonding thickness, that is, a thickness of the adhesive. This ensures a suitable bonding quality that structurally connects the cover plates to the shear web and provides for the intended lifetime of the shear web.

According to an embodiment, after the bonding step, the two cover plates are pressed firmly against the corresponding lateral sides by applying a vacuum. For example, a vacuum device is provided which includes at least one vacuum pump, one or more hoses, et cetera. With such a setting, vacuum can be applied to firmly press the cover plates against the shear web. This contributes to a high-quality bonding wherein, in particular, any unwanted air and excess adhesive is pressed out of the bonding area.

According to an embodiment, a fleece is provided on the outer surfaces of the cover plates for applying the vacuum. This contributes to an effective and uniform vacuum process.

According to an embodiment, after the bonding step, heat is applied for curing the adhesive. This finishes the bonding process by stably connecting the defect-bridging device to the shear web.

According to an embodiment, the cover plates are additionally screwed to the shear web. For example, the cover plates are screwed to the shear web after the bonding step, but before the steps of applying vacuum or curing. The additional screwing helps to hold the cover plates in position, which simplifies the bonding process and contributes to an overall defect-bridging quality.

According to an embodiment, the first cover plate and the second cover plate each include a flange portion wherein, in the bonded state, the flange portions are, additionally to an adhesive bond, connected to each other in a form-fit manner. In other words, the cover plates are in direct, form-fit engagement. This contributes to stable and effective defect-bridging.

According to an embodiment, the flange portions are adapted to a contour of the root end of the shear web. In other words, there is a form-fit engagement of the defect-bridging device with the shear web itself which provides for a very stable and structurally advantageous positioning.

According to an embodiment, each of the two cover plates is a fiber composite component. The layup mimics the original layup of the shear web and therefore ensures returning to configuration properties after the application.

According to a second aspect, a wind turbine rotor blade for a wind turbine is disclosed. The wind turbine rotor blade includes two spar caps and a shear web. The shear web includes a root end and a tip end and extends between the spar caps along a longitudinal direction of the rotor blade from the root end to the tip end. The shear web includes two opposite longitudinal edges, each longitudinal edge facing a respective spar cap, and running along the longitudinal direction. The shear web has a first lateral side and a second lateral side running between the two opposite longitudinal edges. The shear web has a defect at the root end, the defect running essentially along the longitudinal direction. The wind turbine rotor blade further includes a defect-bridging device having a first cover plate and a second cover plate, wherein the first cover plate is bonded onto a first surface region of the first lateral side and the second cover plate is bonded on a second surface region of the second lateral side, such that both cover plates at least partly cover the defect.

The wind turbine rotor blade enables the above-mentioned functions and advantages. The above-described embodiments with respect to the first aspect analogously apply to the wind turbine rotor blade.

BRIEF DESCRIPTION OF DRAWINGS

The invention will now be described with reference to the drawings wherein:

FIG. 2 shows a schematic view of a rotor blade;

FIG. 3 shows a schematic view of a cross-section of the wind turbine rotor blade;

FIGS. 6 to 12 show different views of a defect-bridging device according to an embodiment of the disclosure;

DETAILED DESCRIPTION

Figure 1:
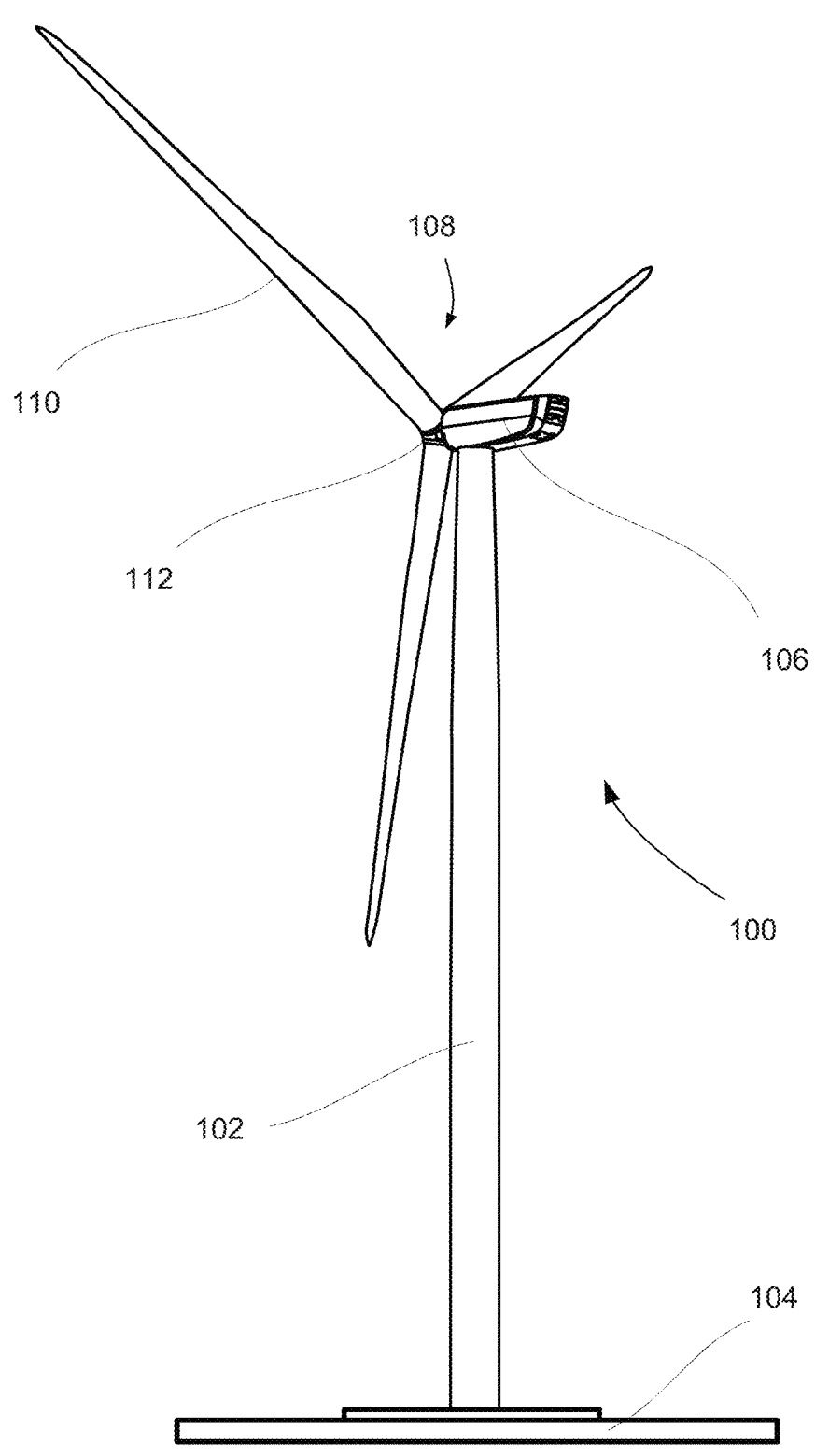
FIG. 1 shows a schematic view of a wind turbine.

FIG. 1 shows a schematic view of a wind turbine 100, which includes a tower 102. The tower 102 is fixed to the ground via a foundation 104. A nacelle 106 is rotatably mounted at one end of the tower 102 opposite to the ground. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

FIG. 2 shows a rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of the rotor blade 110. The rotor blade 110 has a pressure side 122 and an opposite suction side 124 with respect to a longitudinal direction 120 (also main extension direction). The rotor blade 110 is essentially hollow inside.

In the rotor blade root area 114 a rotor blade root end 126 with a flange connection 128 is provided, via which the rotor blade 110 can be mechanically connected to a pitch bearing or an extender.

FIG. 3 shows a schematic cross-section profile 138 (see FIG. 2) of the wind turbine rotor blade 110 running traverse to the longitudinal direction 120. The rotor blade 110 includes a shell 130, which is included by two half-shells 132, wherein one half-shell 132 corresponds to the pressure side 122 and the other one to the suction side 124. The two half-shells 132 are firmly connected to each other along the longitudinal axis at opposite connecting surfaces 134. Each half-shell 132 may have a spar cap 136 embedded in the shell-structure. A spar cap 136 can also be generally named "main laminate" and carries main loads during operation of the rotor blade 110. The rotor blade 110 further includes at least one shear web 140 connecting the spar caps 136.

Figure 13:
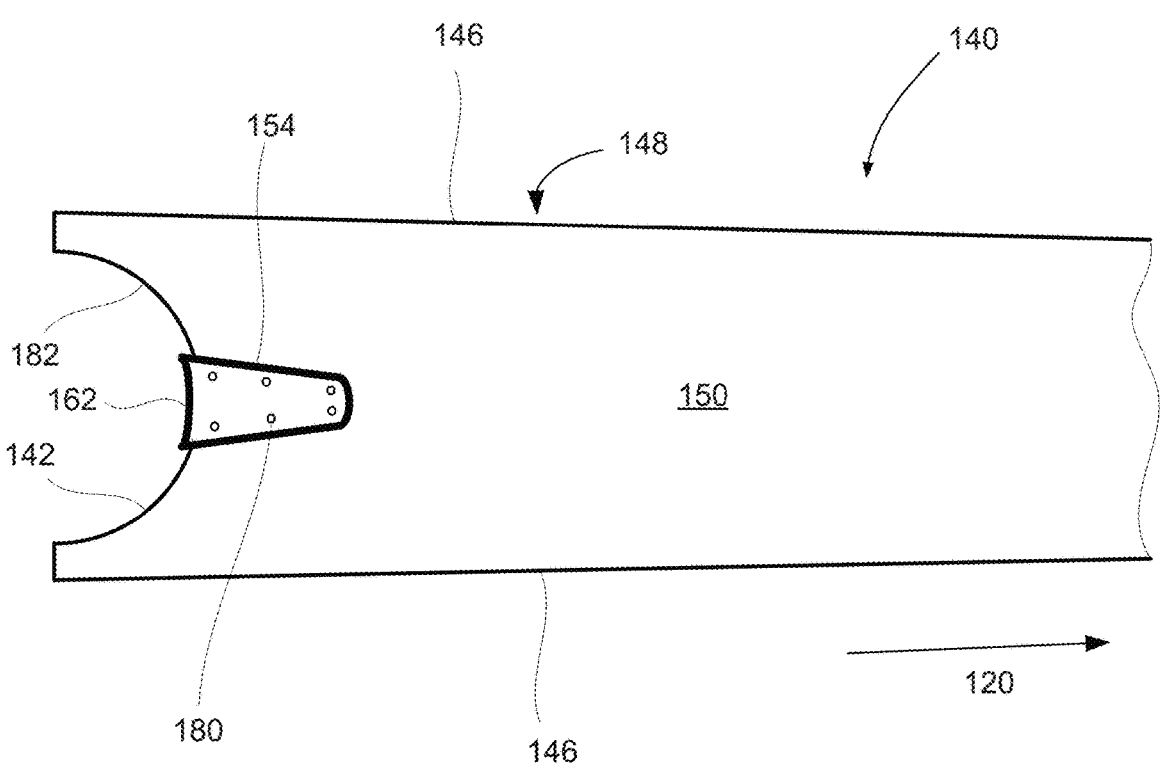
FIG. 13 shows a schematic side view of a section of the shear web according to FIG. 4 with the defect-bridging device being mounted; and, FIG. 14 shows a schematic flow chart of a method for repairing a shear web according to an embodiment of the disclosure.
Figure 14:
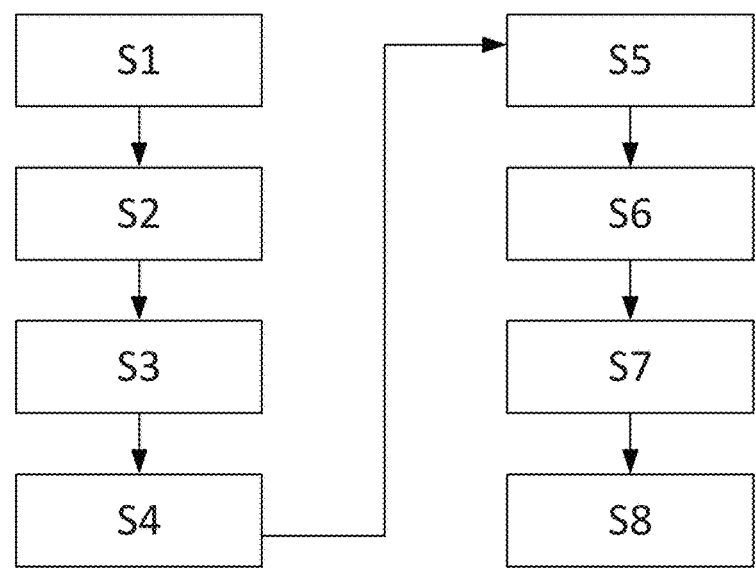

In the following, a method for repairing the shear web 140 of the wind turbine rotor blade 110 according to an embodiment of the disclosure is described with the aid of FIGS. 4 to 13, wherein FIG. 13 shows a schematic flow diagram of the method.

Figure 4:
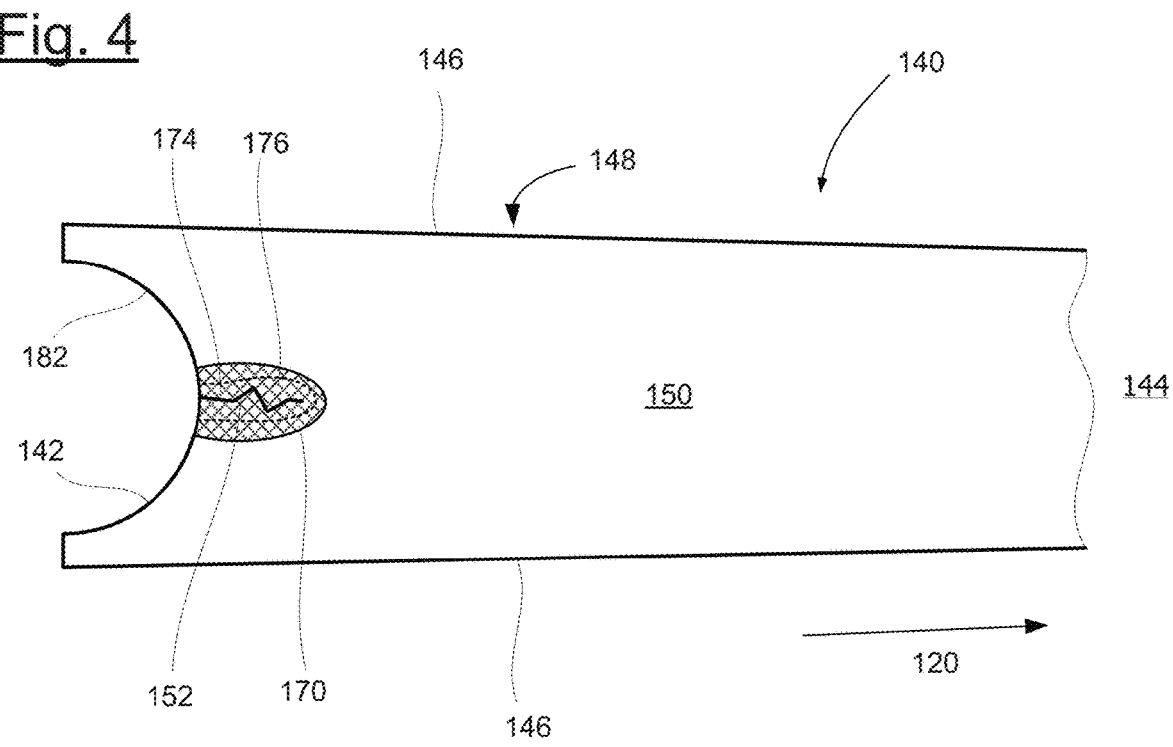
FIG. 4 shows a schematic side view of a section of a shear web of the wind turbine rotor blade.
Figure 5:
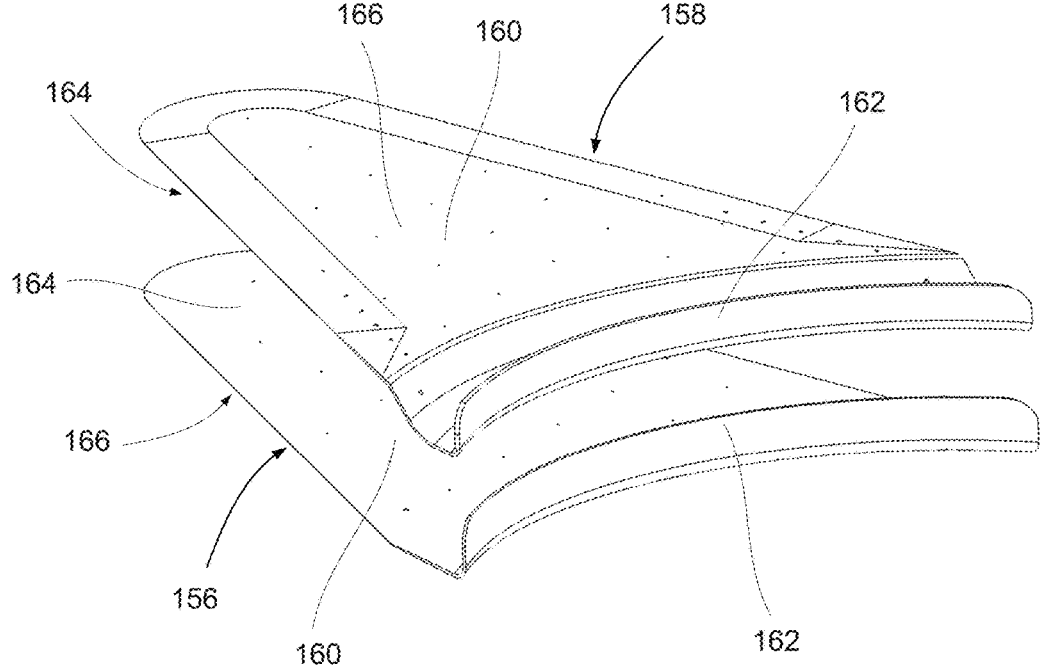
FIG. 5 shows a defect-bridging device according to an embodiment of the disclosure.

FIG. 4 shows a schematic side view of a shear web 140. The shear web 140 extends from a root end 142 to a tip end 144 (in the FIG. 4 the shear web 140 is shown shortened and the tip side end is not shown) along the longitudinal direction 120. The shear web 140 has two opposite longitudinal edges 146, each longitudinal edge 146 facing a respective spar cap 136 and running along the longitudinal direction 120 (see also FIG. 3). With regard to FIG. 3, the shear web 140 has a first lateral side 148 and a second lateral side 150 running between the two opposite longitudinal edges 146. The shear web 140 has a defect 152 at the root end 142, the defect 152 being a crack and a surrounding delamination in the shear web 140. The defect 152 runs essentially along the longitudinal direction 120.

In order to repair the defect, in an embodiment of the disclosure the following steps are performed.
Step S1:

A defect-bridging device 154 (shown in FIG. 5) having a first cover plate 156 and a second cover plate 158 is provided. The first cover plate 156 is shown in FIGS. 8 to 10 and the second cover plate 158 is shown in FIGS. 11 to 13. Both the first and the second cover plates 156, 158 are prefabricated fiber composite components being configured to fit onto the shear web 140. Each cover plate 156, 158 includes a base plate 160 and a flange portion 162. Each base plate 160 has an inner surface 164 and an outer surface 166.

Figure 6:
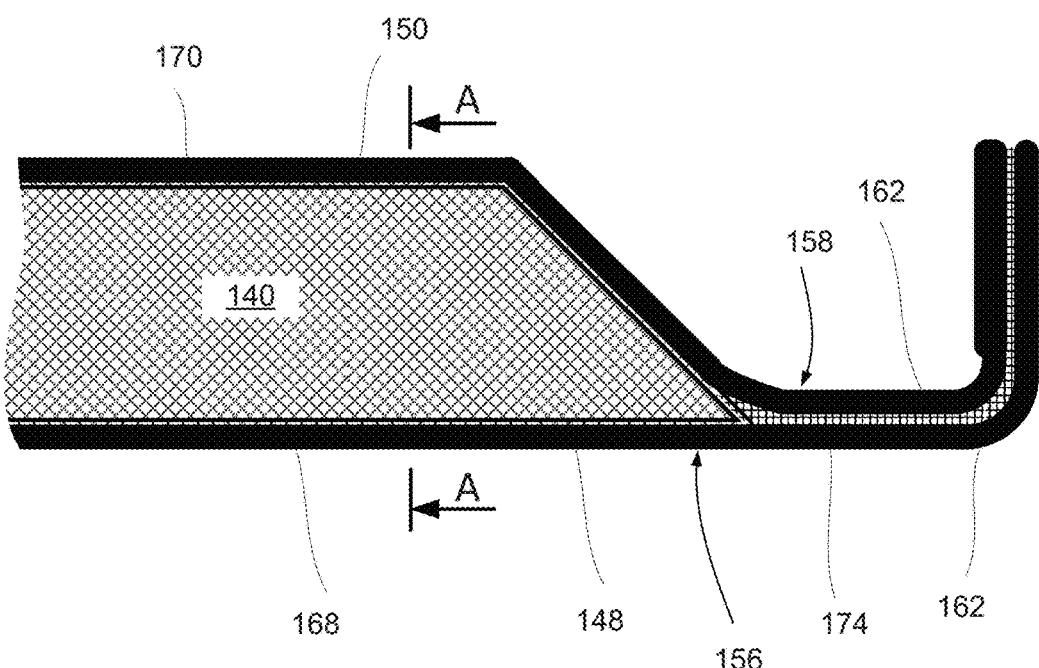
Figure 7:
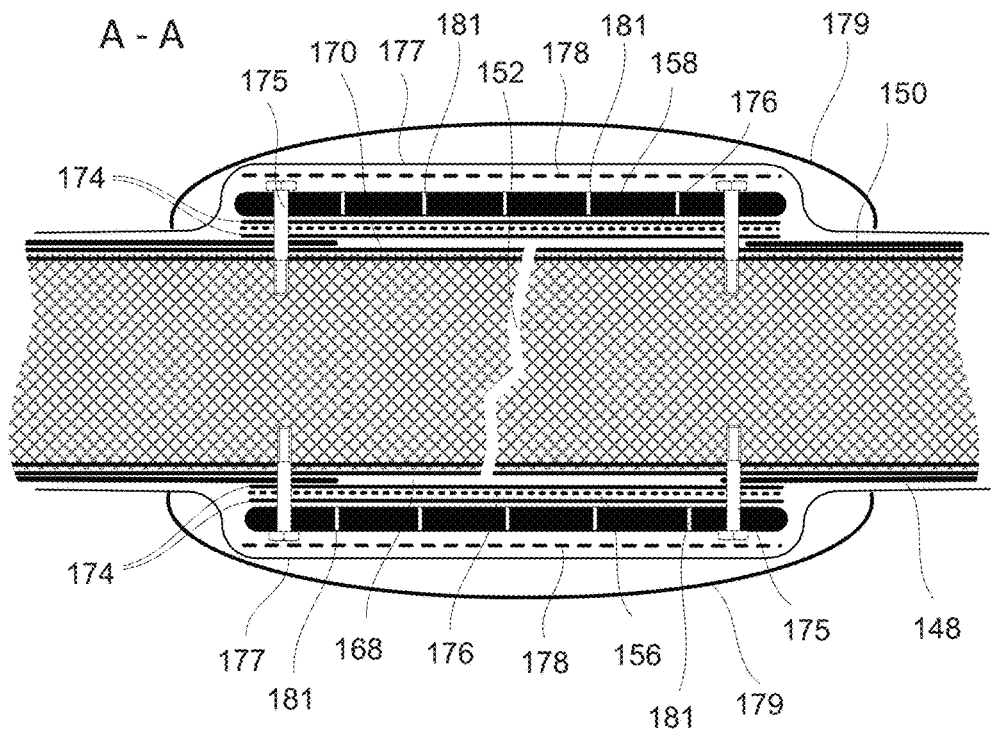

As shown in FIG. 6, the first cover plate 156 is configured to be bonded onto a first surface region 168 of the first lateral side 148. The second cover plate 158 is configured to be bonded onto a second surface region 170 of the second lateral side 150. As indicated in FIG. 7, which shows a cross section A-A from FIG. 6, both surface regions 168, 170 include or overlap the defect 152. In other words, the defect 152 is located within the surface regions 168, 170, seen from both lateral sides 148, 150. The first and second cover plates 156, 158 cover the surface regions 168, 170.

As mentioned, both cover plates 156, 158 include a flange portion 162. The flange portions 162 are configured to engage each other in a form-fit manner. Thus, the cover plates 156, 158 are mounted to the shear web 140 such that the flange portions 162 directly engage each other form-fittingly. Further, the flange portions 162 are manufactured to fit over the shear web 140, meaning that the end face 182 of the shear web 140 which faces the root of the wind turbine 100 is surrounded or covered in a form-fit manner (see FIG. 6). Since the end face 182 of the shear web 140 typically has a contour in a curved configuration, the flange portions 162 are accordingly adapted to follow this curved configuration, that is, the contour of the shear web 140 at the end face 182

(see FIG. 13). The direct connection of the flange portions 162, which is glued together by adhesive 174, adds further strength.

FIG. 8 shows a top view onto the outer surface 166 of the first cover plate 156. FIG. 9 shows a cross-sectional view B-B of FIG. 8. FIG. 10 shows an enlarged view of the detail D from FIG. 9.

With regard to FIG. 9, the inner surface 164 of the first cover plate 156 is covered with a peel ply 172 (indicated by dotted line).

FIG. 11 shows a top view onto the outer surface 166 of the second cover plate 158. FIG. 12 shows a cross-sectional view A-A of FIG. 11.

With regard to FIG. 12, the inner surface 164 of the second cover plate 158 is also covered with a peel ply 172 (indicated by dotted line).
Step S2:

The surface regions 168, 170 are pre-treated prior to the cover plates 156, 158 being bonded onto them. In this step, for example, the surface regions 168, 170 are roughened such that adhesive can bond to the surface regions 168, 170 very well.
Step S3:

The peel plies 172 are removed from the cover plates 156, 158.
Step S4:

Adhesive 174 (as indicated in FIGS. 4 and 7) is applied to each of the surface regions 168, 170. Additionally, adhesive 174 is applied to the inner surfaces 164 of the first and second cover plates 156, 158 for bonding them to the respective surface region 168, 170 at a later stage.
Step S5:

A mesh 176 is applied to each of the two surface regions 168, 170, each mesh 176 acting as a spacer as already described (see FIGS. 4 and 7 showing the mesh 176 indicated as a cross-like pattern resp. a dotted line).
Step S6:

The first cover plate 156 is bonded with its inner surface 164 onto the first surface region 168 of the first lateral side 148. Further, the second cover plate 158 is bonded with its inner surface 164 onto the second surface region 170 of the second lateral side 150, such that both cover plates 156, 158 completely cover the defect 152.
Step S7:

The two cover plates are pressed firmly against the corresponding lateral sides of the shear web by screwing them via the bolts 175 to the shear web. Afterwards fleece mats 178 are positioned on top of the outer surfaces of the cover plates 156, 158 and a vacuum device 177 or setup is provided for applying the vacuum. Exemplarily, openings or holes 181 are provided in the cover plates 156, 158 in order that excess air and/or excess adhesive can escape during the vacuum process.
Step S8:

Finally, a heating mat 179 is positioned and heat is applied for curing the adhesive 174 to fixedly connect the cover plates 156, 158, and thus the defect-bridging device 154, to the shear web 140. This is exemplarily shown in FIG. 7.

The above-described method enables the functions and advantages as mentioned above. It is noted that at least some of the steps can be performed in a different order. For example, steps S2 and S3 can be exchanged. As another example, the peel plies 172 could be removed after having applied adhesive 174 to the surface regions 168, 170.

Optionally, for example, after step S6, the cover plates 156, 158 are additionally screwed to the shear web 140. For example, the screws 180 (see FIG. 13) are provided along an edge of the cover plates 156, 158. These screws 180 ensure the position of the cover plates 156, 158 of the defect-bridging device with respect to the shear web 140 such that the cover plates 156, 158 cannot slip. Further, with the screws 180, any risk of peeling can be avoided.

With regard to the shown cross-sections B-B and C-C according to FIGS. 9 and 12, at a tip 184 of each cover plate 156, 158, the cover plates 156, 158, in particular the base plates 160, have a ramp, meaning that a plate thickness increases towards the root ends 142 (shown in detail D in FIG. 10). This optimizes load transitions between the cover plates 156, 158 and the shear web 140.

It is understood that the foregoing description is that of the preferred embodiments of the invention and that various changes and modifications may be made thereto without departing from the spirit and scope of the invention as defined in the appended claims.

REFERENCE SIGNS

100 wind turbine
102 tower
104 foundation
106 nacelle
108 rotor
110 rotor blade
112 rotor hub
114 rotor blade root region
116 transition region
118 profile region
120 longitudinal direction
122 pressure side
124 suction side
126 rotor blade root end
128 flange connection
130 shell
132 half-shell
134 connecting surface
136 spar cap
138 cross-section profile
140 shear web
142 root end
144 tip end
146 longitudinal edge
148 first lateral side
150 second lateral side
152 defect
154 defect-bridging device
156 first cover plate
158 second cover plate
160 base plate
162 flange portion
164 inner surface
166 outer surface
168 first surface region
170 second surface region
172 peel ply
174 adhesive
175 bolt
176 mesh
177 vacuum device
178 fleece
179 heating mat
180 screw
181 hole
182 end face
184 tip

8

The invention claimed is:

1. A method for repairing a shear web of a wind turbine rotor blade, the wind turbine rotor blade including two spar caps and the shear web, the shear web including a root end and a tip end and extending between the two spar caps along a longitudinal direction of the wind turbine rotor blade from the root end to the tip end, the shear web having two opposite longitudinal edges, each of the two longitudinal edges facing a respective one of the two spar caps and running along the longitudinal direction, the shear web having a first lateral side and a second lateral side running between the two opposite longitudinal edges, the shear web further having a defect at the root end, the defect running essentially along the longitudinal direction, the method comprising:

providing a defect-bridging device having a first cover plate and a second cover plate, both the first cover plate and the second cover plate including an inner surface and an outer surface, wherein the first and second cover plates are prefabricated parts; and, bonding the first cover plate with the inner surface of the first cover plate onto a first surface region of the first lateral side and bonding the second cover plate with the inner surface of the second cover plate onto a second surface region of the second lateral side such that both the first cover plate and the second cover plate completely cover the defect; and, wherein the inner surface of the first cover plate and the inner surface of the second cover plate are each covered by a peel ply.

2. The method of claim 1, wherein the first surface region and the second surface region are pre-treated prior to the bonding step.

3. The method of claim 1, wherein the peel ply covering the inner surface of the first cover plate and the peel ply covering the inner surface of the second cover plate are removed prior to said bonding.

4. The method of claim 1, wherein, prior to said bonding, adhesive is applied to the inner surface of the first cover plate and the inner surface of the second cover plate for bonding the inner surface of the first cover plate and the inner surface of the second cover plate to the respective first surface region and second surface region.

5. The method of claim 4, wherein after said bonding, heat is applied for curing the adhesive.

6. The method of claim 1, wherein, prior to said bonding, adhesive is applied to each of the first surface region and the second surface region.

7. The method of claim 6, wherein after said bonding, heat is applied for curing the adhesive.

8. The method of claim 1, wherein, prior to said bonding, a mesh is applied to each of the first surface region and the second surface region, each of the meshes acting as a spacer.

9. The method of claim 1, wherein, after said bonding, the first cover plate and the second cover plate are pressed firmly against the corresponding lateral sides by applying a vacuum.

10. The method of claim 9, wherein a fleece is provided on the outer surfaces of the first cover plate and the second cover plate as part of a vacuum setup.

11. The method of claim 1, wherein the first cover plate and the second cover plate are additionally screwed to the shear web.

12. The method of claim 1, wherein the first cover plate and the second cover plate each include a flange portion; and, in the bonded state, the flange portions are connected to each other in a form-fit manner.

13. The method of claim 12, wherein the flange portions are adapted to a contour of the root end of the shear web.

14. The method of claim 1, wherein each of the first cover plate and the second cover plate are fiber composite components.

15. A wind turbine rotor blade for a wind turbine, the wind turbine rotor blade comprising:

two spar caps;

a shear web having a root end and a tip end and extending between said two spar caps along a longitudinal direction of the wind turbine rotor blade from said root end to said tip end, said shear web having two opposite longitudinal edges, each longitudinal edge facing a respective spar cap, and running along the longitudinal direction, said shear web having a first lateral side and a second lateral side running between said two opposite longitudinal edges, and said shear web having a defect at said root end, the defect running essentially along the longitudinal direction;

a defect-bridging device having a first cover plate and a second cover plate, wherein the first and second cover plates are prefabricated parts, wherein said first cover plate is bonded onto a first surface region of said first lateral side and said second cover plate is bonded on a second surface region of said second lateral side, such that said first cover plate and said second cover plate at least partly cover the defect; and, said first cover plate having a first inner surface and said second cover plate having a second inner surface, wherein said first inner surface and said second inner surface were each covered by a peel ply prior to being bonded on respective ones of said first surface region and said second surface region.

16. A repair assembly for a wind turbine rotor blade, the wind turbine rotor blade including two spar caps and a shear web, the shear web including a root end and a tip end, the shear web extending between the two spar caps along a longitudinal direction of the wind turbine rotor blade from the root end to the tip end, the shear web having two opposite longitudinal edges, each of the two longitudinal edges facing a respective one of the two spar caps and running along the longitudinal direction, the shear web having a first lateral side and a second lateral side running between the two opposite longitudinal edges, the shear web further having a defect at the root end, the defect running essentially along the longitudinal direction, the repair assembly comprising:

a first cover plate having a first inner surface and a first outer surface;

a second cover plate having a second inner surface and a second outer surface;

wherein the first and second cover plates are prefabricated parts;

said first cover plate being configured to be bonded to a first surface region of the first lateral side so as to completely cover the defect on the first lateral side;

said second cover plate being configured to be bonded to a second surface region of the second lateral side so as to completely cover the defect on the second lateral side; and, wherein said inner surfaces of said first cover plate and said second cover plate are covered by a peel ply configured to be removed prior to said first cover plate being bonded to said first outer surface.

17. The repair assembly of claim 16, wherein said first cover plate and said second cover plate each include a flange portion; and, said flange portions of said first cover plate and said second cover plate are interconnected in a form fitting manner when said first cover plate is bonded to said first surface region and said second cover plate is bonded to said second surface region.

18. The repair assembly of claim 17, wherein said flange portions are adapted to a contour of the root end of the shear web.

* * * * *